Patented May 13, 1941

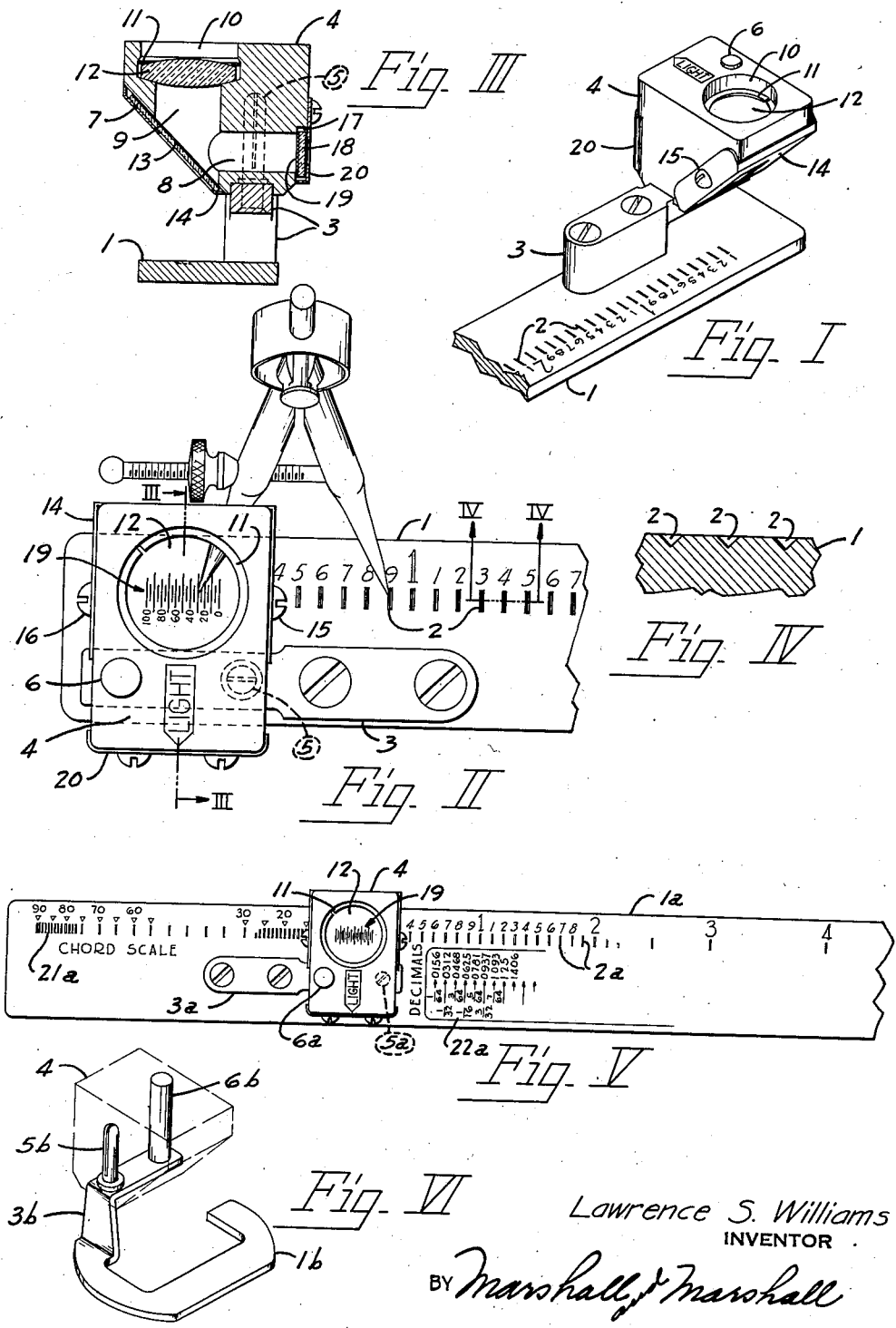

2,241,691

UNITED STATES PATENT OFFICE 2,241,691

DIMENSION DETERMINING DEVICE

Lawrence S. Williams, Toledo, Ohio, assignor to Toledo Scale Company, a corporation of New Jersey Application October 5, 1939, Serial No. 298,069

5 Claims. (Cl. 88—2.3)

This invention relates to dimension determining devices, and particularly to devices for measuring distances between the points of dividers, compasses, and gauges.

The principal object of the invention is to provide an instrument for making accurate measurements of dimensions transferred to or from parts, machine shop layouts, drawings and other structures and representations.

Another object of the invention is to provide an instrument for the aforesaid purposes which is capable of use without being mounted upon a surface plate or other special support, and which is sufficiently portable and adaptable, as well as inexpensive enough, to be desirable as an item of personal equipment for engineers, draftsmen and other skilled craftsmen.

Another object is to provide an instrument having the above-mentioned attributes and with which magnified measurements are easily visible.

Still another object is the provision of an instrument having an interchangeable magnifying measuring unit adapted for mounting upon variously calibrated bases.

Other objects and advantages will be apparent from the following description, in which reference is had to the accompanying drawing illustrating preferred embodiments of the invention and wherein similar reference numerals designate similar parts throughout the several views.

In the drawing—

Fig. I is a view in perspective of a preferred form of the device of the invention, a part of the calibrated base being broken away.

Fig. II is an enlarged top plan view showing the device in use for measuring the distance between the points of a divider, a part of the calibrated base being broken away.

Fig. III is an elevational view in section taken on the line III—III of Fig. II, the divider not being shown in Fig. III.

Fig. IV is a further enlarged fragmentary elevational view in section taken on the line IV—IV of Fig. II.

Fig. V is a reduced plan view showing the magnifying measuring unit of the device mounted upon another calibrated base; and, Fig. VI is a view in perspective of a non-calibrated base adapted to support the magnifying measuring unit for use in direct measurement of small markings or articles, a phantom of the magnifying measuring unit being shown.

The base of the device illustrated in Figs. I and II is in the form of a metal strip 1 having a series of equally spaced short, parallel V-shaped grooves 2 adjacent one of its edges. The sharp bottoms of the grooves are one-tenth of an inch apart. Every tenth groove is numbered with a large numeral representing a number of full inches, and the intermediate grooves are numbered with smaller numerals representing tenths of inches. The material of the base is preferably brass, mild steel or other metal soft enough to permit the grooves to be stamped, so that their apices may be made very sharp. The numerals may be etched. After the grooves are cut, the metal is given a wear-resistant coating, preferably of hard chromium plating, so that the groove apices will remain sharp even after much use.

Secured to the strip 1 is a bracket 3 which extends through a groove in the bottom of a body 4 which may be die cast or otherwise formed of metal or synthetic plastic material, the bracket being held in place in the groove by means of a resiliently expansible pin 5 and a rigid pin 6. The pins 5 and 6 fit closely in bores in the body 4 to position the body accurately, but the fit of the pins in the bores is not so tight as to interfere with ready removal and replacement of the body.

The planes of the top and sides of the body are perpendicular to each other, and the bottom and one side of the body are joined by a flat surface 7 slanting upwardly at an angle of forty-five degrees with respect to the plane of the side.

Formed in the body 4 and extending horizontally therein is a passage 8 which opens at its inner end into a larger vertical passage 9, the axes of the passages 8 and 9 intersecting and being perpendicular to each other. The larger passage 9 has a widened, undercut mouth at its upper end, and secured, by means of an expansible retaining ring 11, in the undercut portion of the mouth 10 is a magnifying lens 12, the axis of the lens being substantially coincident with the axis of the passage 9.

Lying against the slanting surface 7 and intersecting the axis of the lens 12 at a forty-five degree angle is a mirror 13, the upper reflecting surface of which is highly, though not totally, transparent to light from below and also reflects a substantial part of light received from the passage 8. The mirror 13 is held in place by a bezel 14, which in turn is fastened to the body 4 by screws 15 and 16. The opening in the bezel 14 permits objects lying under it to be viewed through the lens 12 and mirror 13.

Extending across the lower end of the other side of the body 4 is a rabbet 17 in which the outer end of the passage 8 terminates, and cemented in the rabbet 17 is a plate 18 of glass or other transparent material, the outer side of which is frosted and the inner side of which is marked with a scale 19 such as is shown reflected and magnified in Fig. II. The edges of the plate 18 are covered by a bezel 20 having an opening to admit light to the scale 19. The scale 19 preferably is produced as a photographic negative, with the figures and graduations transparent, so that when it is viewed by means of the lens 12 and mirror 13, the translucent frosted surface of the plate 18 shining through the transparent figures and graduations imparts a brilliant appearance to the scale. Nevertheless, a divider point or other object on the surface of the strip base is visible through the mirror without sensible darkening.

Although the scale is visible under ordinary room lighting conditions, its brilliancy is enhanced if the device be used with the frosted surface of the plate 18 facing the direction from which the room is principally lighted. An arrow labeled "Light" is inscribed upon the top of the body 4 to instruct the user as to which side of the instrument should face the light.

The perpendicular distance from any point on the scale 19 to a point on the mirror 13 is the same as the distance from that point on the mirror to the plane of the flat top of the metal strip 1. Hence, the scale 19 as viewed through the lens 12 appears to lie upon the flat upper surface of the strip, the scale and objects at the surface of the strip being magnified to the same extent.

In using the instrument of the invention for layout work, a divider or compass is first adjusted with great accuracy by means of the instrument and the work is then marked or scribed with the divider or compass so adjusted. In adjusting a divider, one of its sharp points is placed in a proper groove 2 in the strip, with the other sharp point resting on the surface of the strip under the mirror 13. The point of the divider which is under the mirror will appear through the lens together with the magnified scale (see Fig. II). The divider is then opened or closed until the point which appears with the magnified scale is at the desired distance from the point located in the groove 2.

The lines of the scale 19 are preferably each .002" in width and the spaces between the lines are preferably .003" wide. If one of the divider points were located in the groove marked "9" and the other magnified point were moved into registration with the center of the magnified scale line having a value of .030" (as in Fig. II), the distance between the divider points would be .930"; if the magnified divider point were moved to the further edge of the same line, the distance between the points would be .931", while if it were moved back to the nearer edge of the line, the distance would be .929". If the magnified point were moved one-third across the space beyond the line, the distance between the points would be .932". Thus, because of the magnified appearance of the scale, the distance between the points may be easily adjusted to an accuracy of .001".

Grooved strip bases having various arrangements of graduations and figures representing millimeters, gauge numbers, degrees of arc, etc., may be incorporated interchangeably with the magnifying reading head. In Fig. V the magnifying measuring unit is shown as incorporated with a strip base 1a upon which is fixed a bracket 3a having a resiliently expansible pin 5a and a rigid pin 6a adapted to be received in bores in the body 4 to position the body and hold it in proper relation to grooves 2a and 21a in the strip base 1a. The grooves 2a are spaced and numbered like the grooves 2 in the form shown in Figs. I and II. The grooves 21a are successively located at distances from the point on the strip base at which the "0" mark of the reflected scale appears, which distances are equal to the chords of arcs of a circle having a 2 inch radius. The numerals applied to the grooves 21a represent degrees of arcs according to the chords of which the grooves are located.

To construct any required angle, the user first places one point of a divider in the chord scale groove numbered "60" and adjusts the other point of the divider into apparent registration with the center of the "0" mark on the magnified reflected scale. He then scribes an arc with the divider. The radius of the arc so scribed is 2 inches. He then places one point of the divider in the groove the number of which corresponds to the required angle and again adjusts the other divider point into apparent registration with the center of the "0" mark of the magnified reflected scale. He thereupon places the divider points upon the arc previously scribed, marks the location of the points on the arc and scribes straight lines from the point loci on the arc to the center of curvature of the arc. The angle at the intersection of the straight lines is the required angle.

For convenience in converting magnified decimal readings into common fractions of inches, a conversion table 22a may be etched or otherwise imprinted upon the otherwise vacant surface of the strip base 1a.

When the magnifying measuring unit is incorporated with the non-calibrated base 1b shown in Fig. VI, it is removably fixed to the bracket 3b by means of the resiliently expansible pin 5b and the rigid pin 6b. In using this form of the device, the object to be measured is placed directly under the mirror upon the surface upon which the base 1b rests and the instrument is shifted until one of the graduations, such as the "0" graduation, registers with an edge of the object. Because of the magnified appearance of the object and the equally magnified appearance of the scale, the user is enabled to measure objects to an accuracy of one .001" or less. With the base 1b illustrated in Fig. VI, the instrument may be used for direct measurement of printed or etched lines on surfaces, for thread counts in fine fabrics, for determining variations from uniformity and prescribed dimensions of small objects or markings.

Objects viewed with the aid of the instrument are seen right side up and their details are not obscured by the scale or by such unusual lighting or glare as is liable to be encountered in using microscopes with inbuilt lamps. The scale and the object being at the same distance from the lens, they are equally magnified and there is no parallax, notwithstanding the fact that the object and scale may be seen from any position in a relatively wide cone of vision. The instrument can be used with facility by relatively unskilled persons. In lightness, compactness and inexpensiveness it is greatly superior to cumbersome devices embodying costly measuring microscopes and telescopes.

The embodiments of the invention herein shown and described are to be regarded as illustrative only, and it is to be understood that the invention is susceptible to variation, modification and change within the spirit and scope of the subjoined claims.

Having described the invention, I claim:

1. In a device of the class described, in combination, a flat member, a series of sharply defined notches in said flat member, said notches being spaced to represent units of a system of mensuration, a bracket secured to said flat member, a viewing device removably seated upon said bracket and projecting into a plane passing vertically through said series of notches, said viewing device comprising a body, passages extending through said body, a scale having a series of transparent graduations representing subdivisions of a unit of the system of mensuration represented by said sharply defined notches, mounted in one of said passages, a transparent mirror mounted in one end of another of said passages and adapted to reflect an image of said transparent graduations on said scale and a lens mounted in the other end of said passage for simultaneously magnifying such reflected image and an object positioned on said flat member beneath said transparent mirror.

2. In a device of the class described, in combination, an elongated member bearing two series of graduations upon its upper face, the graduations of each series being spaced according to units of a different system of mensuration, a viewing device mounted on said elongated member and provided with a magnifying means, a transparent mirror and a scale, said scale being graduated into subdivisions of a unit of one of said series of graduations on said elongated member, said transparent mirror being positioned so as to reflect an image of said scale into apparent coincidence with the upper face of said elongated member, said scale being so located with respect to said series of graduations on said elongated member that one of its reflected terminal graduations constitutes a common fiduciary mark and such reflected image of said scale appears as an uninterrupted continuation of that series of graduations of which its graduations are subdivisions, and said magnifying means, transparent mirror and scale all being mounted in such operative relation that such reflected image is magnified when viewed through said magnifying means.

3. In a device of the class described, in combination, a member having upon its upper face a series of sharply defined notches spaced so as to represent units of a system of lineal mensuration, a viewing device mounted upon said member, said viewing device having a scale graduated into subdivisions of one of said units of said system of lineal mensuration, said scale being marked upon a surface which is perpendicular to the upper face of said member, a transparent mirror for reflecting an image of said scale into apparent coincidence with the upper face of said member, and a lens said viewing device being so located upon said member that such reflected image of said graduations of said scale appears as the magnified uninterrupted continuation of said sharply defined notches in said member when viewed through said lens.

4. In a device of the class described, in combination, an elongated member having upon its upper face a series of graduations spaced so as to represent units of a system of lineal mensuration, a viewing device comprising a graduated scale, the graduations on said scale conforming to said system of lineal mensuration and a transparent mirror through which the upper face of said member is visible, said mirror being positioned to reflect such graduations into apparent coincidence with the upper face of said member so that said graduations on said scale when viewed through said viewing device appear as the uninterrupted continuation of said graduations on said elongated member.

5. In a device of the class described, in combination, a member having upon its upper face a series of grooves adapted to selectively receive one arm of a two-armed measuring instrument, magnifying means mounted upon said member, said magnifying means including a scale and means for reflecting a magnified image of said scale into apparent coincidence with the upper face of said member where said magnified image may be viewed together with the other arm of said two-armed measuring instrument, said scale being calibrated to indicate the spacing of said arms of said two-armed measuring instrument.

LAWRENCE S. WILLIAMS.